United States Patent Office 2,735,777
Patented Feb. 21, 1956

2,735,777

PROCESS FOR THE IMPROVEMENT OF TASTE, DIGESTIBILITY, AND STABILITY OF FISH MEAT

Albert Meyer, Ramsen, Germany, assignor to Calgon, Incorporated, Pittsburgh, Pa., a corporation of Pennsylvania No Drawing. Application May 19, 1952,
Serial No. 288,759

Claims priority, application Germany May 19, 1951

10 Claims. (Cl. 99—111)

The present invention relates to a method for the treatment of fish meat by means of polymeric phosphates for the purpose of improving taste, stability, digestibility, and color of said fish meat.

Certain types of fish such as herring, are caught only during certain seasons of the year but in such huge quantities that they cannot be transported immediately to market for prompt consumption. It is necessary, therefore, to preserve such fish for later use by relatively simple methods. In the case of herring, this is done by packing the fish in salt brine solutions in large kegs. However, by this treatment, not only is the color of the fish impaired but also the quality of the fish meat is likewise impaired resulting in a texture which is tough and leathery. It has therefore been a necessity to find a method of preventing this change in texture of the fish meat in the preserving process.

I have made the discovery that the compounds of polymeric phosphoric acid are quite suitable for achieving a desired result in improving the character of fish meat with regard to color, taste, and digestibility. This property of the polymeric phosphates can be utilized quite advantageously in the salting of green herring. If for example, to the brine I add a polymeric phosphate, I obtain a product which has not only a much more agreeable taste and one which has a better appearance, but moreover the time of treatment can be materially shortened. This process can be carried out without making any radical changes in the present manner of treatment. After the green herrings have been washed, heads and bones removed, and the fish eviscerated in the usual manner, they are placed in a 2–3% common sodium chloride solution for about one-half to about three-quarter hour for bleeding. The fish are then laid in brine solution which contains vinegar, common salt (sodium chloride), hydrogen peroxide, and the polymeric phosphate which I have found to be so advantageous. As an example of the phosphate which I may use, the glassy tetra phosphates such as sodium tetraphosphate ($Na_6P_4O_{13}$) or the pyrophosphate ($Na_4P_2O_7$) are suitable. I use these materials in a concentration in the solution of from about 0.5% to about 1.0% based on the weight of the solution itself, or, alternatively, in a concentration of from about 0.2% to about 2.0% based on the weight of the fish. In the same manner, the salted herrings are treated after they have been washed before the removal of the heads, bones, etc. for at least twelve hours. The manner of operation according to this invention can be applied to any other fish and I do not limit myself only to the treatment of herring but am able to bring about a general improvement in quality with other species of fish.

Among the compounds of polymeric phosphoric acids which I include in my disclosure are in the first place, the water-soluble alkali-metal and ammonium salts of the pyro-, meta-, and other polyphosphoric acids, such as for example tripoly phosphoric acid, tetra phosphoric acid, etc. as well as the alkaline earth salts and the heavy metal salts of these polymeric phosphoric acids, with particular reference to the complex salts. These are all suitable for my process as well as the polymeric phosphates known as Kurrol's salts which can be used for this treatment. The Kurrol's salts, which are crystalline potassium metaphosphates having a molar ratio of $K_2O$ to $P_2O_5$ of 1 to 1, being water-insoluble, are converted in a known manner for instance by addition of sodium or ammonium salts, into a water-soluble form. Finally, a special manner of achieving the claimed process consists in employing the described phosphates together with the salts of the palatable acids such as the citrates, tartrates, etc.

The described action of the polymeric phosphates is of course not limited solely to the preserving process which has been mentioned. My process can also be employed in the manufacture of canned fish. In this type of operation, the addition of phosphate can be made at any stage of the process. An effect can be noticed even when the phosphate, either alone or with one of the salts of the palatable acids, is added for treatment immediately before cooking of the fish.

*Example*

Herring fillets which had been washed for a period of about 24 hours were put in a brine solution containing the following materials:

6% vinegar
9% common salt (NaCl)
0.1% of a 33% hydrogen peroxide
1.0% sodium tetra pyrophosphate It was noted that after immersion for a 6-day period, a tender, light fish meat was obtained which was particularly useful for marinating.

Having thus described my invention, what I claim as new and desire to secure by Letters Patent of the United States is as follows:

1. A method of improving the keeping properties of fish meat which is preserved in an uncooked state in brine which comprises exposing said fish meat to a sodium chloride brine containing from about 0.2 percent to about 2.0 percent by weight of a polymeric phosphoric acid compound based on the weight of the fish meat so exposed.

2. The method as described in claim 1 wherein the polymeric phosphoric acid compound is a salt selected from the group consisting of the water-soluble alkali-metal and ammonium salts of the pyro-, meta-, tripoly-, and tetraphosphoric acids.

3. The method as described in claim 1 wherein the polymeric phosphoric acid compound is a water-insoluble crystalline potassium metaphosphate which is capable of being converted into a water-soluble form by the addition of sodium and ammonium salts.

4. The method as described in claim 1 wherein the polymeric phosphoric acid compounds are employed in conjunction with the salts of the palatable acids.

5. A method of improving the taste, digestibility and keeping properties of fish meat which comprises contacting said fish meat with a sodium chloride brine solution containing a compound of a polymeric phosphoric acid in a concentration which is from about 0.2 percent to about 2.0 percent based on the weight of the fish meat.

6. A method according to claim 5 characterized by the fact that the compound of a polymeric phosphoric acid is present in a concentration which is from about 0.5 percent to about 1.0 percent based on the weight of the fish meat.

7. A method of improving the taste, digestibility and keeping properties of fish meat which comprises contacting said fish meat with a sodium chloride brine solution containing vinegar, hydrogen peroxide, and a compound of a polymeric phosphoric acid, said polymeric phosphoric acid compound being present in a concentration which is from about 0.2 percent to about 2.0 percent based on the weight of the fish meat.

8. A method according to claim 7 characterized by the fact that the compound of a polymeric phosphoric acid is present in a concentration which is from about 0.5 percent to about 1.0 percent based on the weight of the fish meat.

9. A sodium chloride brine useful in improving the taste, digestibility and keeping properties of fish meat which contains a compound of a polymeric phosphoric acid in an amount which is from about 0.2 percent to about 2.0 percent based on the weight of fish meat to be treated through contact with said sodium chloride brine.

10. A sodium chloride brine as described in claim 9 which contains vinegar and hydrogen peroxide.

References Cited in the file of this patent

UNITED STATES PATENTS

| 2,488,184 | Garnatz et al. | Nov. 15, 1949 |
| 2,554,625 | McFee et al. | May 29, 1951 |
| 2,555,236 | Kreidl et al. | May 29, 1951 |